(12) United States Patent
Hill et al.

(10) Patent No.: US 11,709,323 B2
(45) Date of Patent: *Jul. 25, 2023

(54) CONNECTOR PACK FOR AN OPTICAL FIBER ENCLOSURE

(71) Applicant: Clearfield, Inc., Minneapolis, MN (US)

(72) Inventors: John P. Hill, Oak Grove, MN (US); Randy T. VanHorn, Princeton, MN (US); Joshua J. Povlitzki, Otsego, MN (US); Timothy J. Kjolsing, Chaska, MN (US)

(73) Assignee: Clearfield, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/823,619

(22) Filed: Aug. 31, 2022

(65) Prior Publication Data

US 2022/0404557 A1 Dec. 22, 2022

Related U.S. Application Data (63) Continuation of application No. 17/237,788, filed on Apr. 22, 2021, now Pat. No. 11,435,531.

(60) Provisional application No. 63/014,205, filed on Oct. 22, 2020.

(51) Int. Cl.
*G02B 6/36* (2006.01)
*G02B 6/38* (2006.01)
*G02B 6/44* (2006.01)

(52) U.S. Cl.
CPC ......... *G02B 6/3831* (2013.01); *G02B 6/3825* (2013.01); *G02B 6/3849* (2013.01); *G02B 6/4471* (2013.01)

(58) Field of Classification Search
CPC .. G02B 6/3831; G02B 6/3825; G02B 6/3849; G02B 6/4471; G02B 6/36
See application file for complete search history.

(56) References Cited

U.S. PATENT DOCUMENTS

| | | | |
|---|---|---|---|
| 9,977,198 B2* | 5/2018 | Bund | G02B 6/3879 |
| 11,435,531 B2* | 9/2022 | Hill | G02B 6/3849 |
| 2017/0205588 A1* | 7/2017 | Lee | G02B 6/3825 |
| 2019/0170961 A1* | 6/2019 | Coenegracht | G02B 6/4444 |

* cited by examiner

*Primary Examiner* — Jennifer Doan
(74) *Attorney, Agent, or Firm* — Troutman Pepper Hamilton Sanders LLP (57) ABSTRACT

A connector pack for an optical fiber enclosure has a plurality of connector slots each for receiving a respective connector on a cable. The connector pack has a first set of connector slots on a first side of a connector pack body and a second set of connector slots on a second side of the connector pack body. The first set of connector slots and the second set of connector slots each include a latch opening for receiving a latch of a respective connector. The latch opening of the first set of connector slots is offset with respect to the latch opening of the second set of connectors. According to some embodiments, the latch opening of the first set of connector slots is inverted with respect to the latch opening of the second set of connector slots.

20 Claims, 10 Drawing Sheets

CONNECTOR PACK FOR AN OPTICAL FIBER ENCLOSURE

CROSS REFERENCE TO RELATED APPLICATION

This application is a continuation of U.S. patent application Ser. No. 17/237,788 filed Apr. 22, 2021 entitled "Connector Pack for an Optical Fiber Enclosure," which claims the benefit of priority under 35 U.S.C. 119(e) to the filing date of U.S. Provisional Patent Application 63/014,205, filed on Apr. 23, 2020, the contents of both of which are incorporated herein by reference in their entirety.

TECHNICAL FIELD

The present disclosure relates generally to optical fiber enclosures, and more particularly to a connector pack for an optical fiber enclosure.

BACKGROUND

Data, voice, and other communication networks are increasingly using fiber optics to carry information. In a fiber optic network, each individual fiber is generally connected to both a source and a destination device. Additionally, along the fiber optic run between the source and the destination, various connections or couplings may be made on the optical fiber to adjust the length of the fiber or to provide termination connection ports for end users at which one or more fibers may be branched from a feed cable.

To interconnect the cables, various cable connector designs provide for low insertion loss and stability. Some example connectors may include, but are not limited to, SC, Dual LC, LC, ST and MPO connectors. In most of these designs, ferrules (one in each connector, or one in the connector and one in the apparatus or device), each containing an optical fiber end, are butted together end to end and light travels across the junction.

With the increasing desire for completely optical networks, "fiber to the premises" (FTTP) or "fiber to the home" (FTTH) systems are being developed to provide optical fibers that extend from the source to the site of the end-user. Optical fiber enclosures are used for management of cables that extend to various user locations.

Figure 1A:
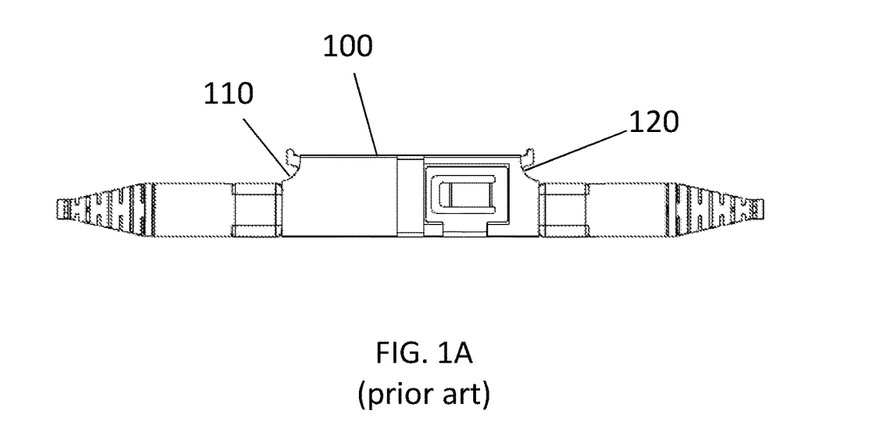
FIG. 1A is a side view of a prior art connector pack.
Figure 1B:
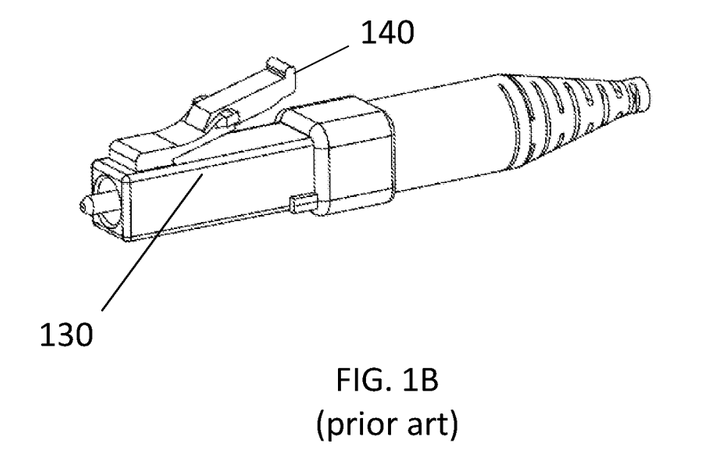
FIG. 1B is a perspective view of a prior art connector for a cable.

Optical fiber enclosures often include connector packs, sometimes called adapters, that create a fiber cable junction that can interface with cable connectors, such as LC connectors. Some current connector packs include input slots on multiple sides for accepting a connector. For example, FIG. 1A shows a prior art connector pack 100 having slots on two sides 110, 120 and FIG. 1B shows a prior art LCUPC connector 130 having a connector latch 140 that is configured to be inserted into the slots on the two sides 110, 120. As shown in FIG. 1A, the connector latch 140 of the connector 130 is on a top side regardless of the side 110, 120.

Figure 1C:
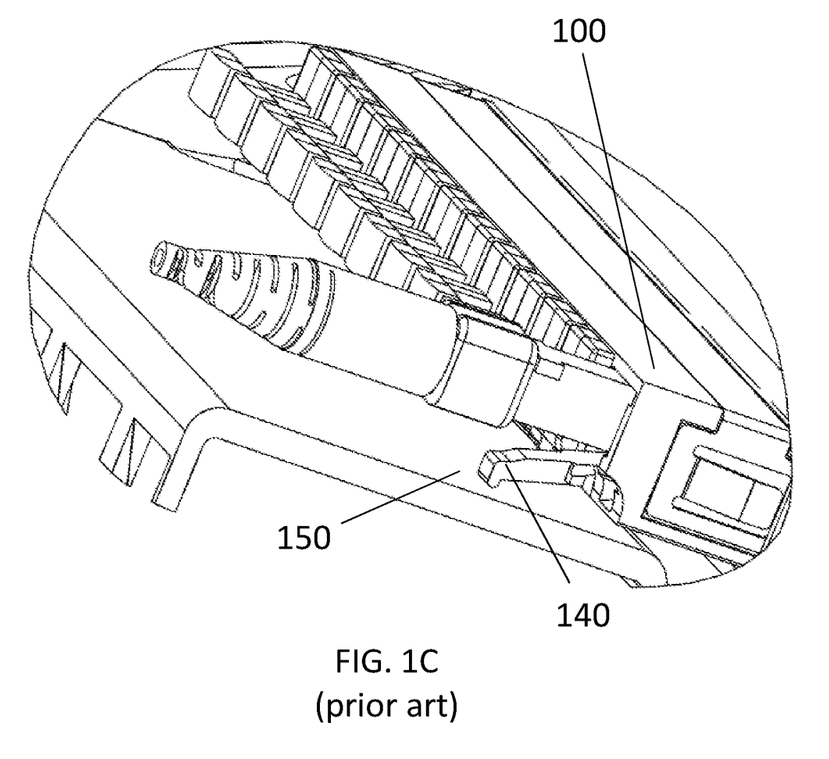
FIG. 1C is a perspective view of a prior art connector pack installed in an optical fiber enclosure.

The dual-sided configuration of the connector pack 100 enables the connector pack 100 to be inserted, for instance, into a swinging door of an optical fiber enclosure, with some connectors being inserted on one side of the door and other connectors being inserted on another side of the door, usually at an angle with respect to the door. However, because the connector latch 140 is on the top side regardless of the side 110, 120 of the connector pack 100, there often arises a situation in which it is difficult to remove or install a connector on one of the sides 110, 120 of the connector pack 100. FIG. 1C illustrates an example of this problem, as it can be seen that the connector latch 140 is forced to be positioned close to a surface of a door 150, and is thus difficult to manipulate and remove.

The present disclosure includes a description of a connector pack that addresses these and other problems of the prior art.

SUMMARY

According to one aspect, the present disclosure is directed to a connector pack for an optical fiber enclosure including a plurality of connector slots each for receiving a respective connector on a cable. The connector pack includes a first set of connector slots on a first side of a connector pack body and a second set of connector slots on a second side of the connector pack body. The first set of connector slots and the second set of connector slots each include a latch opening for receiving a latch of a respective connector. The latch opening of the first set of connector slots is offset with respect to the latch opening of the second set of connectors. According to some embodiments, the latch opening of the first set of connector slots is inverted with respect to the latch opening of the second set of connector slots.

According to another aspect, the present disclosure is directed to a connector pack assembly. The connector pack assembly includes a connector pack body. The connector pack body includes a first set of connector slots on a first side of a connector pack body and a second set of connector slots on a second side of the connector pack body. The first set of connector slots and the second set of connector slots each include a latch opening for receiving a latch of a respective connector. The latch opening of the first set of connector slots is offset with respect to the latch opening of the second set of connectors. The connector pack assembly also includes a plurality of dust caps installed in the first and second sets of connector slots.

According to another aspect, the present disclosure is directed an optical fiber enclosure including a swinging door and a connector pack installed in the swinging door such that a first set of connector slots are present on one side of the swinging door and a second set of connector slots are present on another side of the swinging door. The first set of connector slots are inverted with respect to the second set of connector slots such that latch openings of all connector slots are positioned furthest from the swinging door surface on both sides of the swinging door.

The present disclosure is not limited in terms of the particular embodiments described in this application, which are intended as illustrations of various aspects. Many modifications and variations can be made without departing from its spirit and scope, as will be apparent to those skilled in the art.

DETAILED DESCRIPTION

Aspects of the present disclosure are directed at optical fiber enclosures that provide connectors between cables via cable connectors and, in particular, a connector pack having a plurality of connector slots for accepting a cable connector. Embodiments of the optical fiber enclosure and connector pack may be configured to accept a variety of cables and connectors, which allows the disclosed components to be integrated into any network architecture and deployment. Various embodiments of optical fiber enclosures disclosed herein simplify fiber deployment and other functions, such as by enabling easier access, connection, and removal of cables through a more easily operable connector pack and latch configuration.

Figure 2A:
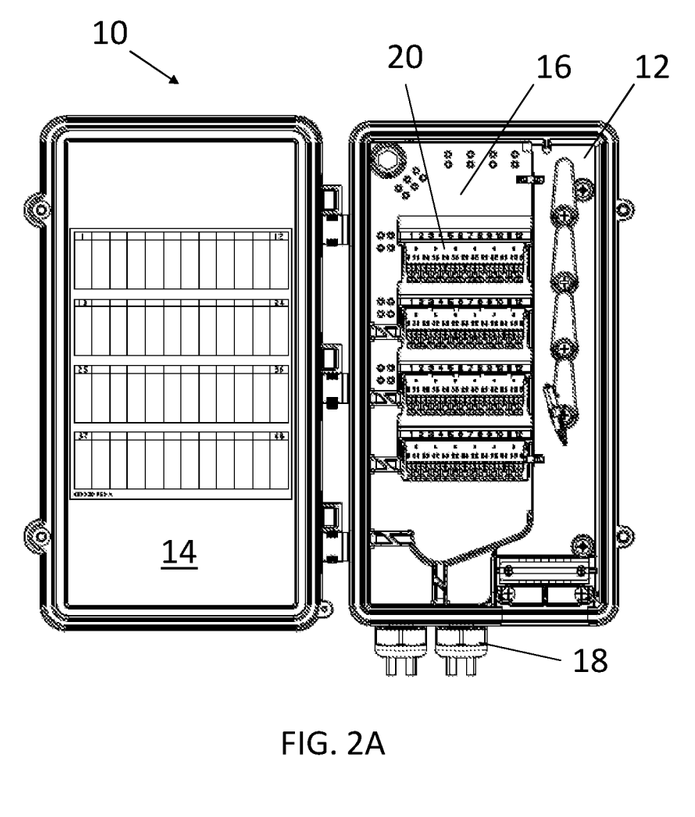
FIG. 2A is a perspective view of one embodiment of an optical fiber enclosure including a closed door and an adapter pack, according to aspects of the present disclosure.
Figure 2B:
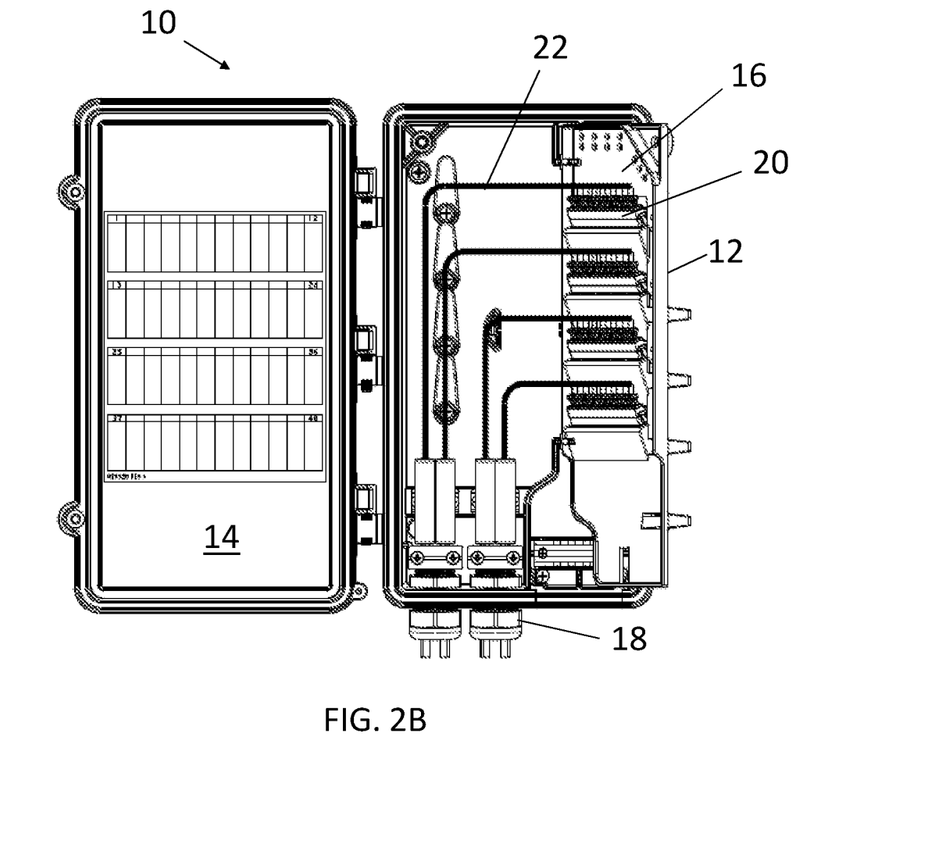
FIG. 2B is a perspective view of the optical fiber enclosure including an open door and the adapter pack, according to aspects of the present disclosure.

FIG. 2A shows one embodiment of an enclosure 10. The enclosure 10 includes a housing 12 defining a storage space. In this embodiment, the housing 12 is a rectangular wall box. In other embodiments, the housing 12 may have a different shape. The housing 12 may be connected to a hinged cover 14 for closing the enclosure 10. The housing 12 may include an internal door 16 separating the storage space into a rear space and front space. FIG. 2A shows a first position in which the internal door 16 is closed and FIG. 2B shows a second position in which the internal door 16 is open. The housing 12 of the enclosure 10 may further include entry/exit ports 18 for a stored cable.

As shown in FIGS. 2A-2B, the enclosure 10 may further include one or more connector packs 20 installed in the internal door 16. The connector packs 20, according to disclosed embodiments, are configured to receive cable connections, such as the cables 22 shown in FIG. 2B, on each side of the internal door 16. The connector pack 20 is, in at least some embodiments, a separate component configured to be inserted into a slot in the internal door 16. In some embodiments, the connector pack 20 is oriented at an angle with respect to a surface of the internal door 16, as is known in the art to provide a connection path that is closer to the plane of the internal door 16 than perpendicular thereto, thereby providing effective and efficient routing of cables without bending.

Figure 3A:
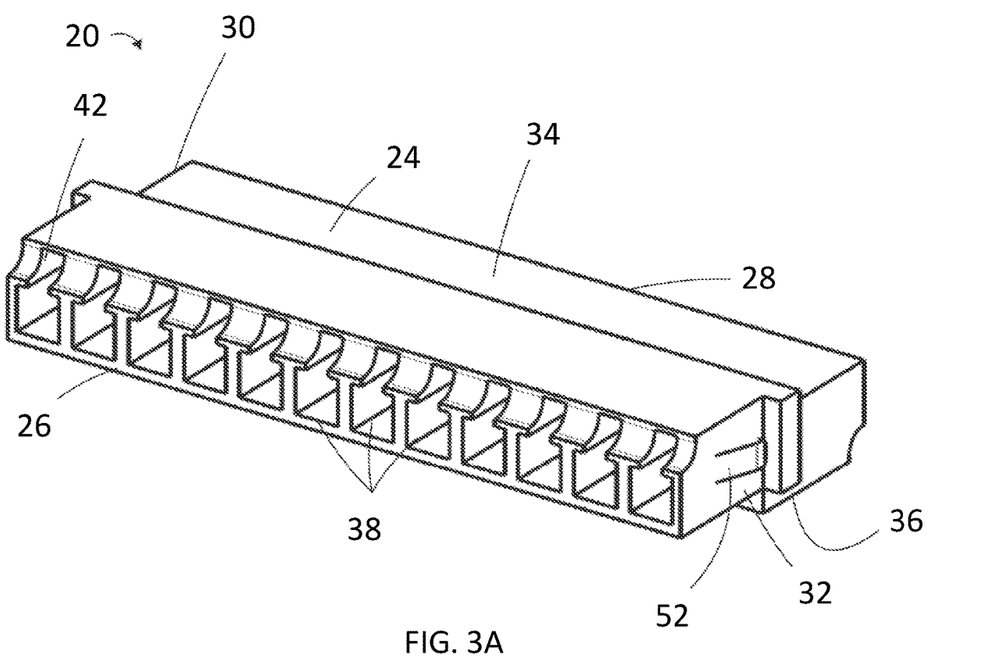
FIG. 3A is a first top perspective view of one embodiment of an adapter pack, according to aspects of the present disclosure.
Figure 3B:
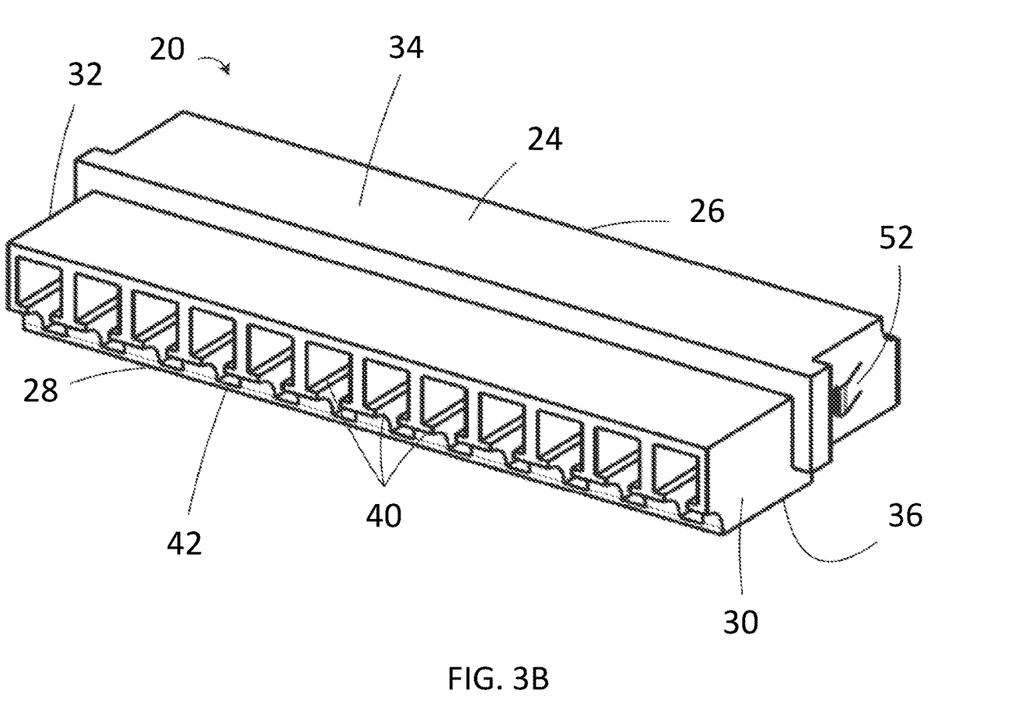
FIG. 3B is a second top perspective view of the adapter pack, according to aspects of the present disclosure.

FIG. 3A is a top perspective view of an exemplary embodiment of the connector pack 20. FIG. 3B is a bottom perspective view of the connector pack 20. The connector pack 20 includes a body 24. The body 24 may be configured in a rectangular shape having four perimeter sides 26, 28, 30, 32, a top side 34, and a bottom side 36. The four perimeter sides may include longitudinal sides 26, 28 opposed from each other and transverse sides 30, 32 also opposed from each other. It should be understood, however, that other embodiments of a connector pack may include other shapes and configurations.

The body 24 includes a first set of connector slots 38 and a second set of connector slots 40. In an exemplary embodiment, the first set of connector slots 38 are formed on a first side of the body 24, such as the longitudinal side 26 and the second set of connector slots 40 are formed on a second side of the body 24, such as the longitudinal side 28. In this way, the first set of connector slots 38 are opposed to the second set of connector slots 40 (e.g., they open or "face" in opposite directions). This configuration enables installation of the connector pack in a slot of an internal door of an enclosure and provides outward facing connector slots on each side of the internal door.

As shown in FIGS. 3A-3B, each of the connector slots of the two sets of connector slots 38, 40 includes a latch opening 42, respectively. The latch opening 42 is a portion of the slot 38, 40 configured to receive a latch portion of a connector. For example, as shown in FIG. 1B, a connector may include a flexible latch mechanism on one side for engaging a latch opening and retaining the connector in the connector slot. Consistent with disclosed embodiments, the body 24 may be configured with latch openings 42 such that the latch openings 42 of the first set of connector slots 38 is inverted with respect to the latch openings 42 of the second set of connector slots 40.

Figure 4:
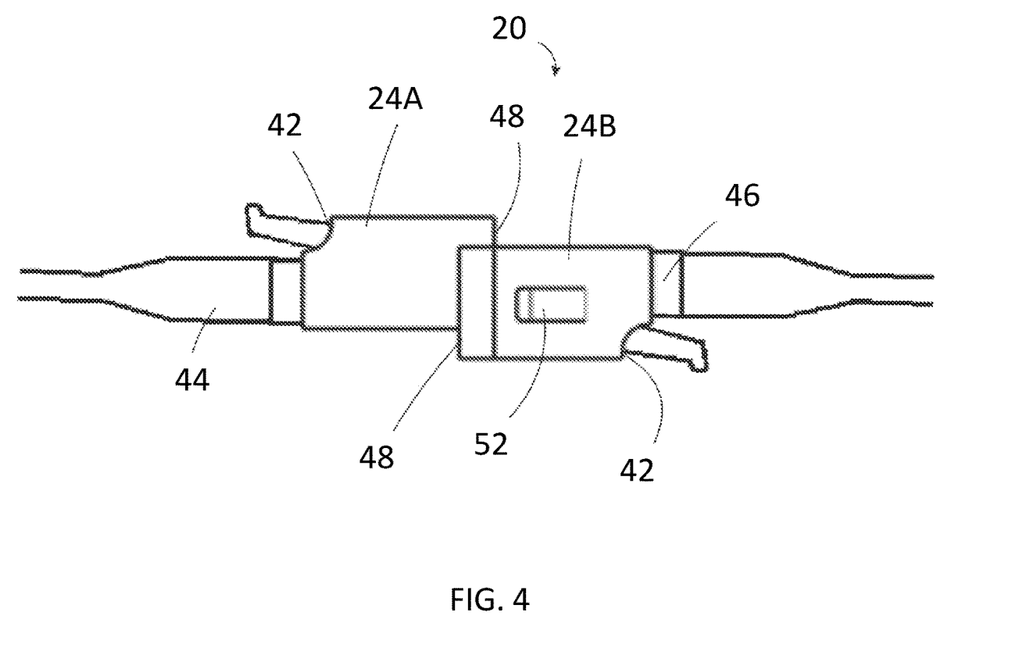
FIG. 4 is a side view of the adapter pack, according to aspects of the present disclosure.

FIG. 4 is a side view of the connector pack 20 including the body 24 and showing exemplary connectors 44, 46 installed in opposing connector slots of the first and second sets of connector slots 38, 40. As shown in FIG. 4, the configuration of the opposing slots is such that the latch openings 42 are offset from each other. In this case, the latch openings 42 of the first set of connector slots 38 is at the top side 34 and the latch openings 42 of the second set of connector slots 40 is at the bottom side 36.

The body 24 of the connector pack 20 may be formed as one integral piece or may be formed as two separate sets of connector slots that are removably or permanently attached to each other. For instance, the body 24 may include a first half 24A having the first set of connector slots 38 and a second half 24B having the second set of connector slots 40. In this way, the sets of connector slots 38, 40 may be modular and interchangeable with other similar components and sets of connector slots. In some embodiments, including embodiments in which the halves 24A and 24B are integral and embodiments in which they are separate, the first half 24A may be offset from the second half 24B such that one or more stop ledges 48 are formed near a middle portion of the body 24.

Figure 5:
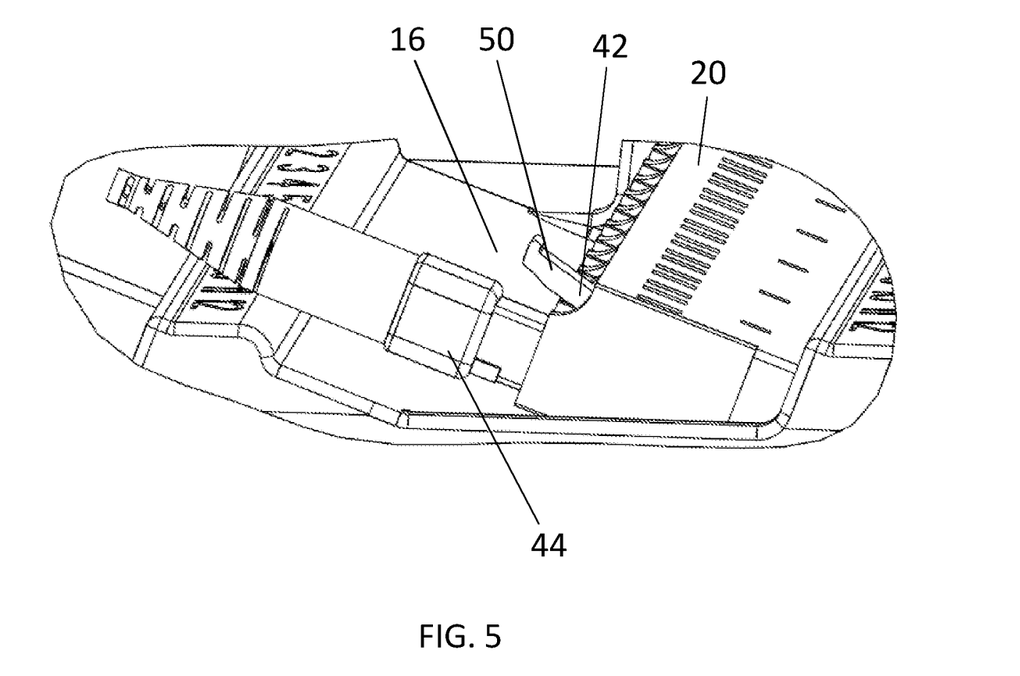
FIG. 5 is a perspective view of the connector pack installed in an optical fiber enclosure, according to aspects of the present disclosure.

The configuration of the connector pack 20 having separate sets of connector slots that are configured as offset slots and/or inverted latch openings enables easier use of each set of openings and associated connectors when the connector pack is installed in an optical fiber enclosure, such as the internal door 16 of the enclosure 10. For example, the offset connector slots provide a configuration in which the inverted latch openings are always furthest from a surface of the internal door 16. FIG. 5 is an example of an installed connector pack 20 in the internal door 16. As shown, the latch 50 and latch opening 42 are furthest from the surface of the internal door 16, providing a user with easy access to the latch. Due to the inverted latch openings, both sets of connector slots will include such a configuration on both sides of the internal door 16, as compared to the conventional connector packs that produce at least one side having the configuration shown in FIG. 1C in which a latch opening is closest to the surface of the internal door, and, thus, hard to reach and manipulate.

Figure 6:
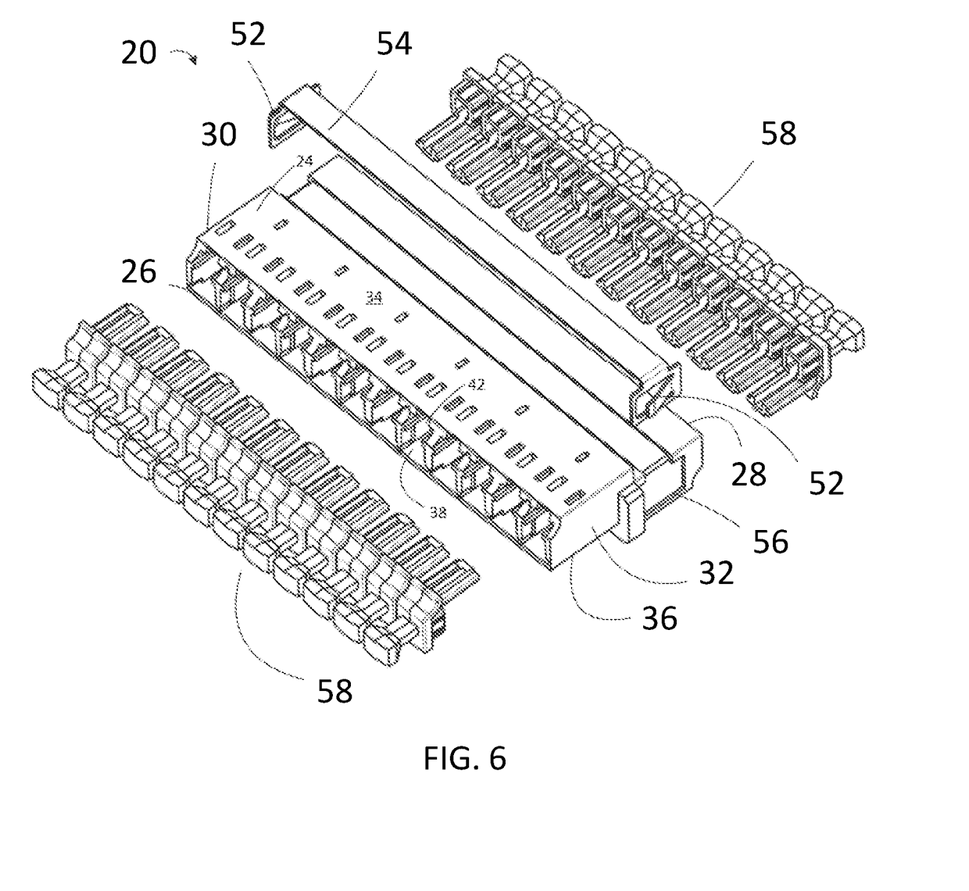
FIG. 6 is a top perspective view of a connector pack assembly, according to aspects of the present disclosure.

FIG. 6 is another top perspective view of the connector pack 20 further illustrating features of an example of a connector pack assembly. In some embodiments, the connector pack 20 may include snap connectors 52 that attach to mating connectors in a socket of the internal door 16 to hold the connector pack 20 in place. The snap connectors 52 may be formed on a separate collar 54 configured to be installed onto the body 24. The body 24 may include an integral indentation 56 configured to receive the collar 54 such that a surface of the collar 54 is flush with an adjacent surface of the body 24. In some other embodiments (e.g., as shown in FIGS. 3A, 3B, and 4) the snap connectors 52 may be integrally-formed with the body 24 of the connector pack. The connector pack assembly may further include dust caps 58 for installation in the connector slots 38, 40 for protecting the connector slots 38, 40 and latch openings 42 when not in use (e.g., during shipping).

Various embodiments of an optical fiber enclosure that may be used in conjunction with the disclosed connector pack may be configured for wall mounting. In some embodiments, the enclosure may include a security screw with the ability to secure with padlock. Various embodiments of the optical fiber enclosures disclosed herein are designed to fast-track and simplify fiber installations when landing, for example, 12 to 24 fibers in any environment. Various embodiments have a compact design that efficiently uses available space. Various embodiments of the optical fiber enclosure may be configured to accept a variety of drop cables that are routed through the housing and connected via connectors inserted into one or more connector slots in a connector pack consistent with disclosed embodiments. Various embodiments of the enclosure may be integrated into any network architecture and deployment. For example, the enclosure may be used in a fiber distribution system comprising one or more distribution terminals. In some embodiments, the fiber distribution system may comprise a plurality of distribution terminals arranged in a daisy chained configuration. A distribution terminal may have at least one feeder port and a plurality of distribution ports.

In some embodiments, the distribution terminal may be configured to receive a fiber through the feeder port and to output a plurality of fibers through the plurality of distribution ports of the terminal, at least one fiber of the plurality of fibers being received by the enclosure through the sealable port of the enclosure. The plurality of fibers may be configured to be split and/or routed to a connector pack consistent with disclosed embodiments.

In some embodiments, the terminal may be configured to receive a plurality of swappable modules. In some embodiments, the module may be configured to receive different types of splitters having different split ratios. In some embodiments, the module may be configured to receive any optical component, including any type of connector. In some embodiments, the module may include one or more connector packs disclosed herein.

The fiber distribution system may further comprise a plurality of connectors. The connectors may be configured to couple with a plurality of distribution ports of the distribution terminal. The connector pack of the enclosure may be configured to receive the connectors. In some embodiments, each connector of the plurality of connectors may be configured to receive epoxy so as to provide a hardened connector.

In some embodiments, the enclosure may comprise a mount configured to attach the enclosure to a user location. The enclosure may comprise at least one sealable port configured to receive one of a connector and a duct configured to receive pushable fiber therethrough. The enclosure may comprise at least one port configured to provide a drop cable to the user location, and at least one spool. In some embodiments, the enclosure may be configured to provide a plurality of different types of drop cables.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A connector pack for an optical fiber enclosure, comprising:
    a connector pack body defining:
        a top side;
        a bottom side;
        a first longitudinal side;
        a second longitudinal side;
        a first set of connector slots disposed on and in communication with the first longitudinal side, at least one connector slot of the first set of connector slots comprising a first latch opening disposed adjacent to the top side of the connector pack body and configured for receiving a latch of a first connector; and
        a second set of connector slots disposed on an in communication with the second longitudinal side, at least one connector slot of the second set of connector slots comprising a second latch opening disposed adjacent to the bottom side of the connector pack body and configured for receiving a latch of a second connector.

2. The connector pack of claim 1, wherein the first set of connector slots are in communication with the second set of connector slots such that an end of a first optical fiber in a first ferrule of the first connector is configured to butt end-to-end with a second optical fiber in a second ferrule of the second connector.

3. The connector pack of claim 1, wherein the first latch opening of the first set of connector slots is offset with respect to the second latch opening of the second set of connector slots.

4. The connector pack of claim 1, wherein the first latch opening is configured to be oriented furthest from a surface of an internal door of an enclosure.

5. The connector pack of claim 4, wherein the first latch opening of the first set of connector slots is nearest the top side and the second latch opening of the second set of connector slots is nearest the bottom side.

6. The connector pack of claim 1, wherein the connector pack body comprises a first part and a second part, wherein the first set of connector slots are formed in the first part and the second set of connector slots are formed in the second part.

7. The connector pack of claim 6, wherein the first part and the second part are integrally formed as one piece.

8. The connector pack of claim 6, wherein the first part and the second part are separate components.

9. The connector pack of claim 6, wherein the first part and the second part are offset such that a stop ledge is formed at a middle portion of the connector pack body.

10. A connector pack assembly, comprising:
    a connector pack body defining:
        a top side;
        a bottom side;
        a first longitudinal side;

a second longitudinal side;

a first set of connector slots disposed on and in communication with the first longitudinal side, at least one connector slot of the first set of connector slots comprising a first latch opening disposed adjacent to the top side of the connector pack body and configured for receiving a latch of a first connector;

a second set of connector slots disposed on an in communication with the second longitudinal side, at least one connector slot of the second set of connector slots comprising a second latch opening disposed adjacent to the bottom side of the connector pack body and configured for receiving a latch of a second connector; and at least one dust cap installed in the at least one connector slot of the first set of connector slots.

11. The connector pack assembly of claim 10, further comprising one or more snap connectors disposed on transverse sides of the connector pack body.

12. The connector pack assembly of claim 11, further comprising a collar configured to be mounted to the connector pack body via the one or more snap connectors.

13. The connector pack assembly of claim 12, wherein the one or more snap connectors comprise an indentation, and wherein the collar is configured to fit within the indentation.

14. An optical fiber enclosure, comprising:

a housing comprising a storage space for one or more cables having connectors;

an internal door dividing the storage space into a first space and a second space;

a connector pack installed on the internal door, the connector pack comprising:

a connector pack body defining:

a top side;

a bottom side;

a first longitudinal side;

a second longitudinal side;

a first set of connector slots disposed on and in communication with the first longitudinal side, at least one connector slot of the first set of connector slots comprising a first latch opening disposed adjacent to the top side of the connector pack body and configured for receiving a latch of a first connector; and a second set of connector slots disposed on an in communication with the second longitudinal side, at least one connector slot of the second set of connector slots comprising a second latch opening disposed adjacent to the bottom side of the connector pack body and configured for receiving a latch of a second connector;

wherein the first set of connector slots face the first space, and the second set of connector slots face the second space.

15. The optical fiber enclosure of claim 14, wherein the first latch opening of the first set of connector slots is offset with respect to the second latch opening of the second set of connector slots.

16. The optical fiber enclosure of claim 14, wherein the first latch opening is positioned furthest from a surface of the internal door relative to the second latch opening.

17. The optical fiber enclosure of claim 14, wherein the first set of connector slots are in communication with the second set of connector slots such that an end of a first optical fiber in a first ferrule of the first connector is configured to butt end-to-end with a second optical fiber in a second ferrule of the second connector.

18. The optical fiber enclosure of claim 14, wherein the connector pack body comprises a first part and a second part, wherein the first set of connector slots are formed in the first part and the second set of connector slots are formed in the second part.

19. The optical fiber enclosure of claim 18, wherein the first part and the second part are offset such that a stop ledge is formed at a middle portion of the connector pack body.

20. The optical fiber enclosure of claim 14, further comprising at least one sealable port configured to receive one of a connector and a duct configured to receive pushable fiber therethrough.

* * * * *

UNITED STATES PATENT AND TRADEMARK OFFICE
CERTIFICATE OF CORRECTION

| | |
|---|---|
| PATENT NO. | : 11,709,323 B2 |
| APPLICATION NO. | : 17/823619 |
| DATED | : July 25, 2023 |
| INVENTOR(S) | : John P. Hill et al. |

Page 1 of 1

It is certified that error appears in the above-identified patent and that said Letters Patent is hereby corrected as shown below:

On the Title Page

Under item (60) Provisional application No. 63/014,205, the words "filed on Oct. 22, 2020" should be deleted and --filed on Apr. 23, 2020-- should be inserted in their place.

Signed and Sealed this
Fifth Day of September, 2023

Katherine Kelly Vidal
*Director of the United States Patent and Trademark Office*